United States Patent [19]
Menzies

[11] 3,766,380
[45] Oct. 16, 1973

[54] MONITORING ATMOSPHERIC POLLUTANTS WITH A HETERODYNE RADIOMETER TRANSMITTER-RECEIVER

[75] Inventor: Robert T. Menzies, Pasadena, Calif.

[73] Assignee: The United States of America as represented by the Administrator of the National Aeronautics and Space Administration, Washington, D.C.

[22] Filed: Mar. 24, 1972

[21] Appl. No.: 237,694

[52] U.S. Cl. .......................................... 250/343
[51] Int. Cl. .......................................... G01n 21/26
[58] Field of Search ................... 250/43.5 R, 83.3 R

[56] References Cited
UNITED STATES PATENTS

| 2,930,893 | 3/1960 | Carpenter et al. | 250/43.5 R |
|---|---|---|---|
| 3,517,190 | 6/1970 | Astheimer | 250/43.5 R |
| 3,560,736 | 2/1971 | Billetdeaux | 250/43.5 R |
| 3,501,641 | 3/1970 | Krause | 250/43.5 R |
| 3,700,890 | 10/1972 | Kruezer | 250/43.5 R |

OTHER PUBLICATIONS
"Infrared Detection by Optical Mixing" by Keinman et al. Journal of Applied Physics Vol. 40, No. 2, Feb. 1969 p. 546.
Heterodyne Detection of a Weak Light Beam by Mandel Journal of Optical Society of America, Vol. 56, No. 9 Sept. 1966 pages 1200–1206.

*Primary Examiner*—James W. Lawrence
*Assistant Examiner*—Harold A. Dixon
*Attorney*—Samuel Lindenberg et al.

[57] ABSTRACT

The presence of selected atmospheric pollutants can be determined by transmitting an infrared laser beam of proper wavelength through the atmosphere, and detecting the reflections of the transmitted beam with a heterodyne radiometer transmitter-receiver using part of the laser beam as a local oscillator. The particular pollutant and its absorption line strength to be measured are selected by the laser beam wave length. When the round-trip path for the light is known or measured, concentration can be determined. Since pressure (altitude) will affect the shape of the molecular absorption line of a pollutant, tuning the laser through a range of frequencies, which includes a part of the absorption line of the pollutant of interest, yields pollutant altitude data from which the altitude and altitude profile is determined.

4 Claims, 5 Drawing Figures

PATENTED OCT 16 1973 3,766,380

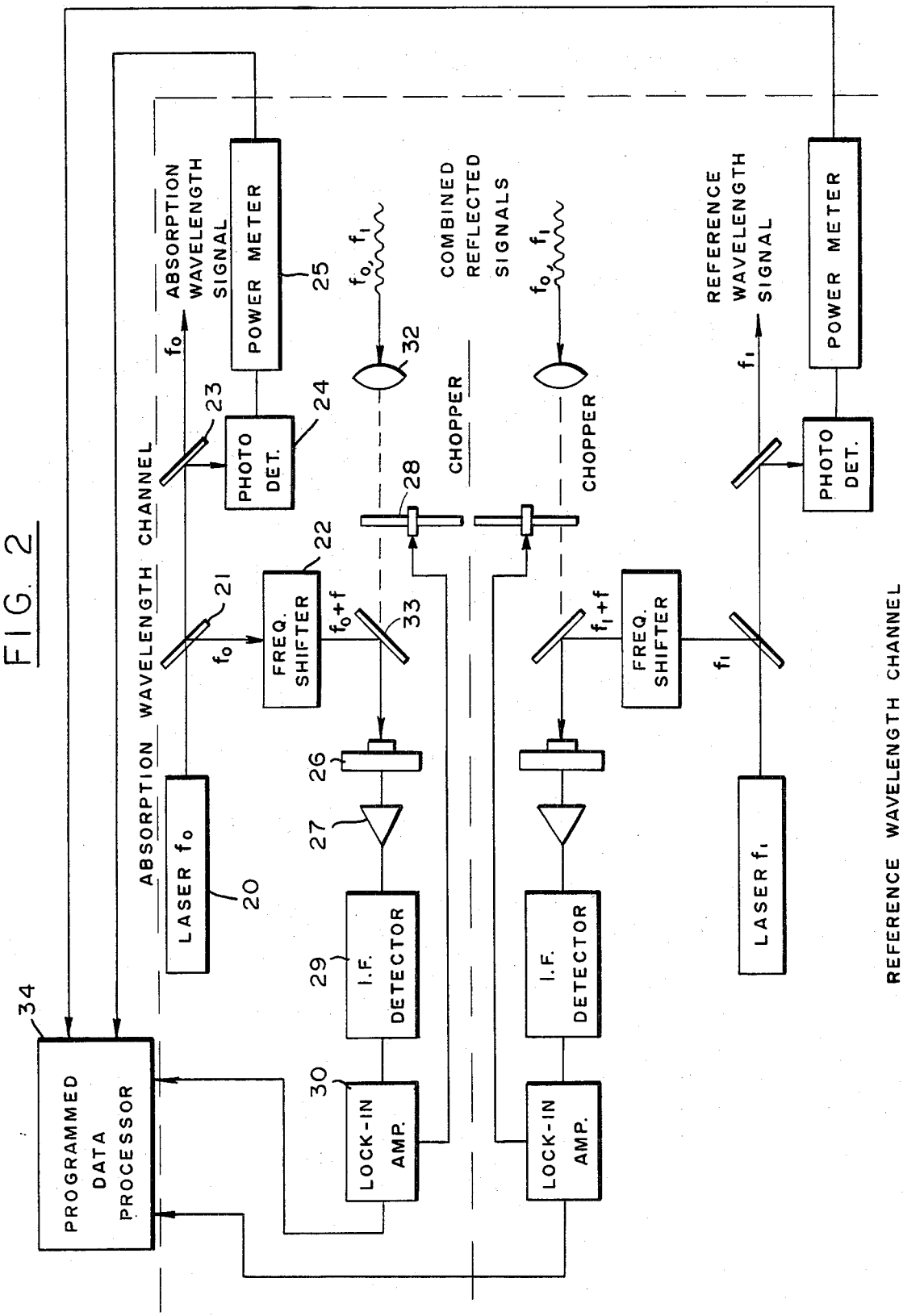

3,766,380

MONITORING ATMOSPHERIC POLLUTANTS WITH A HETERODYNE RADIOMETER TRANSMITTER-RECEIVER

ORIGIN OF THE INVENTION

The invention described herein was made in the performance of work under a NASA contract and is subject to the provisions of Section 305 of the National Aeronautics and Space Act of 1958, Public Law 85–568 (72 Stat.435; 42 U.S.C. 2457).

BACKGROUND OF THE INVENTION

This invention relates to a method for remote monitoring of atmospheric pollutants, and more particularly to a new use of a heterodyne radiometer transmitter-receiver for determining the presence, concentration, altitude, and the altitude profile of selected atmospheric pollutants.

A network of remote pollution sensing stations around the world has been envisioned. These stations would be ground, water, air and satellite borne. They would be tied together in a computerized network, the output of which would be a real-time pollution map of the world. In addition to the commonly known pollutants of CO, $CO_2$, $SO_2$, $O_3$, NO, $NO_2$ and hydrocarbons, at least 31 other pollutants are under investigation by those working in the field of environment protection. They include heavy metals such as mercury, nickel, iron, maganese and zinc; hydrocarbons such as ethylene and formaldehyde; and a variety of organic carcinogens, pesticides, radioactive substances and pollens. This envisioned pollution monitoring system would be similar to the weather prediction network now in use.

The biggest technical obstacle to this type of network is the lack of reliable, service-free sensors for ambient monitoring. The network would require remote sensors, signal-conditioning equipment, interface electronics, telemetry equipment, data processing equipment and display equipment. The remote sensors would have to be non-wet chemical types. The signal-conditioning equipment would be such that each sensor has the same type of output for computer compatibility.

An approach that has been taken in solving the problem of remote sensing of ambient atmospheric constituents involves the use of lasers to look at the optical, infrared or ultraviolet spectral signature of a molecule. Several techniques have been explored which are based on the observation of Raman scattering, fluorescence, thermal emission, and selective absorption.

In Raman spectroscopy, when the high-energy beam of monochromatic laser light passes through the gas, a small portion of the incident light energy is scattered by the molecules and emerges as light of (usually) greater wavelength (smaller frequency). The differences between the frequencies of the incident light and the scattered rays correspond to vibration or rotation frequencies of the molecules normally observed in infrared spectra. Actually when energized by the laser, each constituent emits several wavelengths in the form of a characteristic spectral signature. If the gas has more than one constituent, many return spectral lines may be generated. The problem with this Raman-spectroscopy technique is that the returns are of very low power and an extremely sensitive detection system is required. Quite often the detection of Raman scattering is done with photon counting techniques.

In flourescence spectroscopy, the gas is caused to fluoresce by application of a high power laser beam, that is, it is caused to emit a characteristic color in the ultraviolet, visible, or infrared region. This is used in the detection of nitrogen dioxide by transmitting at about 4000 A and looking for a return in that range from 5200 to 5500. It differs from Raman scattering in that Raman scattering is basically a condition that occurs instantaneously. In other words, in Raman scattering, molecules do not actually absorb energy, become excited and thereafter reradiate over a finite amount of time as they do in fluorescence, where it takes a certain period of time for the molecules to reradiate at a characteristic wavelength after absorbing energy. Flourescence is a promising technique because it has stronger radiated energy capability.

In the thermal emission scheme, advantage is taken of the fact that molecules, raised to a high temperature, radiate at their own characteristic wavelength, which is also the wavelength at which they absorb energy. These thermal emission wavelengths are known for the gases of interest. Detection is by means of a heterodyne radiometer tunable to these wavelengths. Identification of effluent gases from a smoke stack is accomplished remotely by this means. This is a passive technique in that no light beam transmitter is required.

Flourescence and thermal emission are the subject of a copending patent application Ser. No. 80,583 titled "Atmospheric Pollutant Sensing Device" filed by Robert T. Menzies on April 21, 1971 now abandoned in favor of Application Ser. No. 135,929 filed Apr. 21, 1971.

A technique which is based on selective absorption in a double-ended system, as opposed to the previously described systems, would be very desirable for a network of pollution sensing stations. In this technique, light of selected wavelengths passes through the atmosphere and is reflected back through the atmosphere a second time by a remote reflecting surface. The pollutant molecules absorb the light at certain characteristic wavelengths, and the amount of extra absorption of the return light at these wavelengths indicates the concentration of particular pollutants. However, for practical use, the technique must not be limited as to path length or the condition of the reflecting surface.

SUMMARY OF THE INVENTION

In development of a practical remote laser monitoring system, an active method has been developed. This method actively excites the molecules with a laser beam and detects the absorption spectra of the laser signals of various wavelengths which have been diffusely reflected by the terrain, terrain feature or some other object. Detection is by means of a heterodyne radiometer transmitter-receiver. A part of the laser beam is passed through a frequency shifter for use as the heterodyne local-oscillator signal. This method can be employed for monitoring by satellite, aircraft or fixed installation. In a fixed locality, a terrain feature such as a building or mountain can provide the diffuse reflecting surface. The presence of a given pollutant is determined by the absorption of the laser signal at a given wavelength. Knowing or measuring the path length of the laser signal, the average concentration of the pollutant is determined because the amount of absorption of a laser signal of a certain wavelength is proportional to the average concentration times the path length. The altitude profile for a given pollutant is determined by tuning the laser signal over a narrow frequency region which includes the absorption line of the given pollutant, and at each frequency determining the total absorption to obtain line width data, i.e., absorption v. frequency data. As the altitude increases, the pressure decreases, and the absorption line decreases in width. Comparing the bell-shaped curve of the plot to a composite of Lorentzian shaped curves of various half widths, each curve corresponding to the predetermined absorption of the particular pollutant at a certain altitude, yields an altitude profile.

The novel features of the invention are set forth with particularity in the appended claims. The invention will best be understood from the following description when read in conjunction with the accompanying drawings.

BRIEF DESCRIPTION OF THE DRAWINGS

FIG. 2 is a schematic block diagram of apparatus useful in practicing the present invention.

DESCRIPTION OF THE PREFERRED EMBODIMENT

Figure 1:
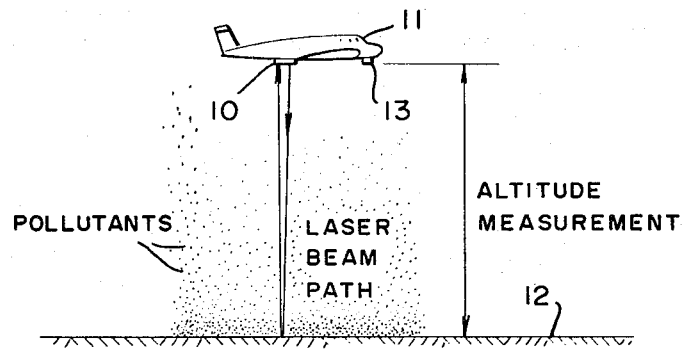
FIG. 1 illustrates schematically one way in which a laser heterodyne receiver-transmitter may be employed in the present invention.

Absorption spectroscopy makes use of the fact that almost all of the known pollutants have their fundamental absorption bands in the infrared portion of the spectrum (about 2 to $15\mu$). If the gas is irradiated with light at absorption wavelength of one of its constituents, these molecules will absorb some of this radiation and change their energy state. This absorption can be detected, and the spectral signature of the constituent can be determined. The absorption detection process consists of determining how much of the transmitted laser energy at each specific wavelength has been absorbed.

The current development of tunable, narrow linewidth laser sources and the existence of spectral overlaps between molecular absorption lines and laser lines bring about the possibility of several types of remote pollutant sensing systems in the infrared. Most molecular linewidths in the 3–15 micron region of the infrared are about $0.1$ cm$^{-1}$ ( $3GH_z$ in frequency units) in an atmospheric pressure background. Laser sources in this wavelength region which have spectral width and stability of less than $0.1$ cm$^{-1}$ can interact strongly and selectively with atmospheric pollutant molecules. Tunable infrared laser sources, such as the PbSnTe diode lasers, currently are the subject of much laboratory investigation and offer fantastic potential in spectroscopic studies. In the remote pollutant sensing field, these tunable laser sources also show promise, although gas lasers such as the CO and $CO_2$ lasers have advantages in certain cases. The CO and $CO_2$ lasers can emit lines which cover much of the region from 5 to 11.5 microns, and some of these lines overlap important pollutant absorption lines. Both of these lasers are efficient and capable of high power output in both continuous and pulsed fashion, and are capable of being tuned over a small range of frequencies sufficient to span an absorption line of interest.

Systems based on direct absorption of laser radiation passing through the atmospheric region of interest are sensitive to concentrations of roughly 10 parts per billion over a kilometer path length. Unfortunately, these systems are double ended and usually require some sort of high quality reflective surface at the opposite end of the path. One interesting application of the present invention illustrated in FIG. 1 involves placing a laser transmitter-receiver 10 aircraft 11, or low orbiting spacecraft, pointing it at the earth 12, using the earth's surface as a diffuse reflector, and monitoring absorption by pollutants in the intervening path. A separate conventional instrument 13 is employed to determine the path length, i.e. the altitude of the aircraft from the earth. The transmitter-receiver 10 is a heterodyne radiometer, preferably of the form shown in FIG. 2.

The return laser beam from such a system would be very weak, due to the poor quality of the earth's surface as a reflector in the infrared region and the large path length. However, a heterodyne radiometer has the sensitivity to detect the return signal. It has been calculated that a heterodyne radiometer with a receiving aperture diameter of 40 cm, an IF bandwidth of 100 KHz, and an integration time of 1 second would be able to detect a diffusely reflected signal from a 5 watt, infrared laser at an altitude of 250 kilometers, and the signal-to-noise ratio would be 300. Thus a laser, such as a $CO_2$ laser which can easily operate reliably at these power levels and with the required frequency stability, could be useful in such a system. The $CO_2$ laser, for example, can be made to emit lines at several wavelengths, and some of these wavelengths overlap absorption lines of ozone, $SO_2$, and ethylene.

By simultaneously transmitting and receiving two laser signals of closely spaced wavelengths, one of which overlaps an absorption line of a pollutant, the heterodyne receiver will read a lower signal level for the overlap wavelength signal, thus indicating the presence of the pollutant. If the pathlength (altitude) is known, the average pollutant concentration can be determined.

Before proceeding with a detailed description of the invention, it should be noted that other ways to implement the instrument will be evident in order to determine the presence, altitude, and concentration-versus-altitude profile of a selected pollutant in atmosphere. It should also be noted that the instrument need not be airborne as illustrated in FIG. 1. Instead, it may be fixed on the ground and pointed directly up through the polluted air, and reflected from a suitable dish hanging down from a balloon held aloft at the end of a cable, or simply a balloon rising in free flight if the continually increasing path length is monitored. All that is necessary is a reliable reflector to return the beam to the instrument in order for the absorption of the beam by the pollutant be determined, thereby determining the presence of a selected pollutant. The pollutant is selected for detection by the proper choice of laser wavelength.

A preferred implementation of the instrument, will now be described with reference to FIG. 2. It is comprised of two laser transmitters and heterodyne radiometer receivers in parallel, one for absorption measurement, and one for reference measurement. The first is labeled Absorption Wavelength Channel, and the second is labeled Reference Wavelength Channel. Since both are identical, except for the wavelength (frequency) of the laser beam, only the Absorption Wavelength Channel will be described.

A laser 20 transmits a beam of a frequency chosen to probe for a selected pollutant. The laser may be selected to inherently transmit the desired frequency or may be adjusted within a range characteristic of a selected laser to transmit the desired frequency.

A beam splitter 21 directs a portion of the laser beam to a frequency shifter 22, which shifts the incoming frequency $f_o$ by an amount $f$, and the balance passes through the beam splitter 21 to a second beam splitter 23 which directs a portion of the laser beam to a detector 24. The voltage or current output of that detector is applied to a power meter 25 to yield an indication of the power of the laser beam transmitted through the beam splitter.

The frequency $f_o$ of the laser beam is selected for the particular pollutant of interest, as noted hereinbefore. The beam is transmitted through the atmosphere and reflected back into the Absorption Wavelength Channel. The function of this channel is to have the local oscillator at frequency $f_o + F$ and the return signal at frequency $f_o$ mix in a mixer detector 26 (an infrared photo-detector) to produce a fixed difference (intermediate) frequency (IF), equal to $f$ (nominally 1 to 50 MHz), which is amplified through a suitable amplifier 27 whose bandpass includes the frequency $f$ and has a bandwidth of nominally 10 MHz.

The incoming (return) signal is chopped by mechanical means 28 and mixed with the local signal at frequency $f_o+f$ to produce a modulated I.F. signal at frequency f whose amplitude envelope is a square wave at the chopper frequency. When this mixed signal is detected by an I.F. detector 29, the result is a square wave at the frequency of the chopping means 28. A lock-in amplifier 30 synchronously detects the amplitude of the square wave to provide a DC output signal $V_A$ which indicates the absorption of the laser beam at frequency $f_o$ by the pollutant in the atmosphere. This is so because, as noted hereinbefore, pollutant molecules will change energy state and absorb radiation. This absorption is detected as described and the presence of the pollutant thus determined from the spectral signature (absorption line) established beforehand in a laboratory or determined from published literature.

To complete a description of the Absorption Wavelength Channel, a low frequency oscillator in the lock-in amplifier 31 is provided to drive the chopping means and synchronize the lock-in amplifier, and a lens 32 is provided to focus reflected light through a beam splitter 33 into the mixer-detector 26. The function of the beam splitter 33 is thus simply to direct light to the detector 26 from both the lens 32 and the frequency shifter 22.

Preliminary calculations show that by using a heterodyne radiometer such as this, there is enough power returned after the beam is reflected from the earth's surface to detect the laser beam with a high signal-to-noise ratio, so that sbsorption coefficients can be monitored reliably as the laser beam passes through the atmosphere.

The receiving optics in the radiometer system are relatively small. The largest diameter collecting mirror needed for most applications is calculated to be about 30 cm. Such a mirror would be required for a satellite system. For an aircraft system which operates at low altitudes, a commensurately smaller collector would suffice. In this case a simple lens with a diameter of 1 or 2 cm would collect sufficient signal for the radiometer. In the case of a satellite application, the altitude was calculated at 250 kilometers using a 10-watt laser transmitter. At satellite altitudes, a beam expanding telescope would be necessary to collimate each of the laser transmitter signals.

In actual operation, a reference laser beam ($f_1$) would also be transmitted by the Reference Wavelength Channel and detected to subtract in a processor 34 the effects of the ground absorptivity and aerosol scattering. In that manner the effects of the molecular atmospheric constituents would be observable with a high degree of sensitivity. The reference wavelength would be close to the signal wavelength, but it would not overlap the pollutant absorption line. It would be necessary to simultaneously observe the reference wavelength and the absorption wavelength so that there would be simultaneous readings of the signals returned.

The reference reading $V_R$ from the Reference Wavelength Channel is received together with the absorption signal $V_A$ by the processor 34 which may be an analog or a digital processor for obtaining the difference $V_A - V_R$ and the ratio $(V_A - V_R)/V_R$ useful in determining the presence, concentration, altitude and altitude profile of pollutants, as desired, in accordance with the present invention.

Since the Reference Wavelength Channel is the same as the Absorption Wavelength Channel, except as to the laser frequency, its organization and operation need not be described. It is sufficient to understand that the frequency $f_1$ of the reference signal must not overlap the pollutant absorption line. It is recognized that the heterodyne signals in each of the two channels will change in the case of an airborne instrument as the aircraft passes over different terrain. However, with the two laser signals pointing in the same direction, both will be influenced equally by the change in terrain, and this affect can be eliminated in the detection system on the processor.

To determine the presence of a pollutant in the atmosphere, the proper frequencies $f_o$ and $f_1$ are selected, and the output signals developed by the two channels are processed to determine the ratio $(V_A - V_R)/V_R$ which by definition is absorption. The presence of the pollutant of interest can then be determined from the absorption thus calculated which will be a value predicted from an absorption line spectrum established in advance. In order to use that ratio as a reading of the presence of the pollutant, the transmitted power levels in each channel are measured by power meters and used in the data processor. If the pathlength of the beam is known, as when bouncing it off the side of a building or when flying-using a ranging system or an altimeter, average concentration C can also be calculated. This results from the fact that the amount of absorption of a laser signal of a certain wavelength is proportional to the average concentration (or partial pressure) of the pollutant times the pathlength. If the pathlength and amount of absorption are known, the relation can be used to determine the average concentration in the path. For accurate results, knowledge of the temperature and ambient pressure in the path should be known, but the accuracy of that information need not be very high in most cases.

Many spectral coincidences have been established and published, such as by P.L. Hanst in Applied Spectroscopy 24, 161 (1970). Other important ones are given by Robert Menzies in Applied Optics 10, 1532 (1971).

Another capability of the laser heterodyne radiometer transmitter-receiver is to make concentration profiles of pollutants according to the present invention i.e., to determine the concentration of a pollutant as a function of its altitude (this is valuable information for modeling air pollution effects, e.g., the creation of smog, and kinetic effects relating to it). One technique for doing this is to tune the laser beam over a narrow frequency region which includes a specific pollutant absorption line of interest. This line, as it exists in the atmosphere, has a certain width which depends on the background pressure. As the altitude increases, the pressure decreases, and the absorption line decreases in width. Accordingly, one can tune the laser over a range which is roughly equal to the line width of the specific pollutant to plot the actual line shape and width; then, if the plot (a bell-shaped curve) is done carefully, a determination of how much pollutant is at a particular altitude in a particular region can be made by comparing that plot to a composite of Lorentzian shaped curves of various half widths, each curve corresponding to the absorption of the particular pollutant at a certain altitude. These Lorentzian shaped curves are predetermined, either mathematically or experimentally. For example, if the plot from the instrument (a bell shaped curve) is identical to a Lorentzian curve with a width which corresponds to the absorption linewidth of low altitude pollutant molecules, then we can assume that all the pollutant exists at low altitude.

The procedure for determining the concentration at different levels or altitudes, once a bell shaped curve is obtained by tuning the laser as just described, is to effectively select and combine Lorentzian shaped curves to form a composite that matches the measured bell shaped curve. Each Lorentzian shaped curve that goes into the composite indicates how much pollutant is at a particular altitude. while one may select the Lorentzian shaped curves manually, such as from sets of overlays of different scales, it is contemplated that the analysis will be carried out mathematically in the data processor programmed to solve certain equations. An example of the analysis follows.

Assume that both the pressure and temperature are known as functions of altitude for the atmospheric region of interest. Pressure versus altitude is well known and constant in time. Temperature versus altitude data change from day to day and depend on the locale, but remote temperature sensors have been developed to obtain this information. The line strength of an absorption line is a function of temperature, and the linewidth depends on pressure and temperature as $$\Delta \nu \sim P / \sqrt{T}$$

1 where $\Delta \nu$ is the linewidth, $P$ is the pressure, and $T$ is the temperature. The absorption line can be expressed as a Lorentzian function of frequency $$k(\nu) = S/\pi \ \Delta\nu/[(\nu-\nu_o)^2 + (\Delta\nu)^2]$$

2 where $k(\nu)$ is the absorption coefficient at a frequency $\nu$, $S$ is the line strength and $\nu_o$ is the center frequency, or frequency of peak absorption. Since we assume a priori knowledge of T and P as functions of altitude, $h$, it is possible to write k($\nu$) in terms of parameters which are functions of $h$. For example, the line strength can be split into two factors, where $S_o$ ($h$) is known and $N(h)$ is the density or concentration of the absorber at altitude $h$.

$$S(h) = S_o(h) \ N(h)$$

3

Assuming the instrument is in an aircraft, it is possible to measure the total absorption by a pollutant at several frequencies which span a linewidth. The expression for total absorption at a given frequency, $\nu$, is $$K(\nu) = \frac{2}{\pi} \int_0^{h_M} S_o(h) N(h) \frac{\Delta\nu(h)}{(\nu-\nu_o)^2 + [\Delta\nu(h)]^2} dh \quad (4)$$

where $h_M$ is the maximum altitude (e.g., the altitude of the aircraft). Since density or concentration of the absorber at altitude $h$ is the value $N(h)$, to be computed given K($\nu$) and the other previously mentioned information, this integral expression is not easy to work with, although numerical methods of solving this expression for $N(h)$ do exist.

If an average concentration throughout the absorption path is desired, average values for the absorption line parameters in the integrand of Equation (4) can be assumed. Then the average concentration, $N$, (no longer a function of $h$) can be obtained from a measurement of $K$ at a particular frequency, $\nu$, by using the equation:

$$K(\nu_1) = 2/\pi \ S_o \ N \ \Delta\nu/[(\nu_1-\nu_o)^2 + \Delta\nu^2]h_M$$

5

It is also possible to approximate the above integral by breaking the atmosphere into a number of altitude segments of height interval $\Delta\nu$. Then assume average values for $S_o$, $\Delta\nu$, and $N$ within each segment. By doing this it is possible to construct a set of linear equations which could be solved with relatively simple methods. For example the total absoption at frequency $\nu_1$ would be composed of contributions from each altitude segment:

$$K_1(\nu_1) = [2 \ S_o(h_1) \ N(h_1)/\pi] \ [\Delta\nu(h_1)/(\nu_1-\nu_o)^2 + [\Delta\nu(h_1)]^2 \ ] \ \Delta h$$
$$= C_{11} N(h_1)$$
$$K_2(\nu_1) = [2 \ S_o(h_2) \ N(h_2)/\pi] \ [\Delta\nu(h_2)/(\nu_1-\nu_o)^2 + [\Delta\nu(h_2)]^2 \ ] \ \Delta h$$
$$= C_{12} N(h_2)$$

$$K_n (\nu_1) = [2 \ S_o \ (h_n) \ N(h_n)/\pi] \ [\Delta\nu(h_n)/(\nu_1-\nu_o)^2 + [\Delta\nu(h_n) \ ]^2 \ ] \ \Delta h$$
$$= C_{1n} N(h_n)$$

6 etc. where $h_1$ to $h_n$ are average altitudes within the respective altitude segments 1 to $n$. By proceeding in this manner it is possible to write a set of linear equations $$K(\nu_1) = C_{11}N(h_1) + C_{12}N(h_2) + \ldots + C_{1n}N(h_n)$$
$$K(\nu_2) = C_{21}N(h_1) + C_{22}N(h_2) + \ldots + C_{2n}N(h_n)$$

$$K(\nu_n) = C_{n1}N(h_1) + C_{n2}N(h_2) + \ldots + C_{nn}N(h_n)$$

etc., where the number of frequencies used equals the number of altitude segments.

Since the pollutant molecules at different altitudes are recognized because their linewidths are different, it would be worthwhile to show how the temperature and pressure at various altitudes affect the linewidth. Since the linewidth depends on both temperature and pressure, one might think of a case in which the two effects could cancel out each other, producing no change in linewidth as the altitude changes. However, the pressure effect is much larger than the temperature effect over scales the size of a kilometer or more. For example, the temperature of a standard atmosphere decreases from 290 K to about 220 K as the altitude increases to 10 kilometers, and then it's constant up to 20 km. This effect would make the linewidth 1.15 times as big at 10–20 km as it is at sea level. However, at 10 km the pressure is about 25 percent of the sea level pressure, and at 20 km the pressure is less than 10 percent of sea level pressure. Thus the linewidth at 20 km is less than 10 percent of the linewidth at sea level due to the pressure effect. Combining the two effects, the linewidth at 10 km altitude would be 29 percent of the sea level linewidth, and at 20 km it would be 11.5 percent of the sea level linewidth.

The profile measurement is predicted upon the monochromaticity of the laser line as compared to the pollutant absorption line. In other words, the laser frequency width is much smaller than the frequency width or linewidth of the pollutant absorption line. One can probe the absorption line by just tuning the laser over that particular frequency region. With other sources of light, this method of altitude profile measurement would be impossible because of the lack of resolution.

This technique can be used to monitor absorption at different lines of the pollutant in addition to monitoring absorption throughout one line. Since the temperature versus altitude data is known, and since the relative line strengths of different absorption lines depend on its temperature, we can deduce information about the altitude of the pollutant in this manner also.

For low altitude systems (aircraft borne), a tunable infrared diode laser might be used in lieu of a gas laser. Several of these diode lasers can be used selectively since they are physically compact. A combination of these tunable lasers can be used to over-lap all of the important pollution molecules. However, diode lasers, at present, do not have sufficient power output. In either case, the laser power transmitted through the atmosphere is sufficiently low that no safety hazard is presented.

Figure 3A:
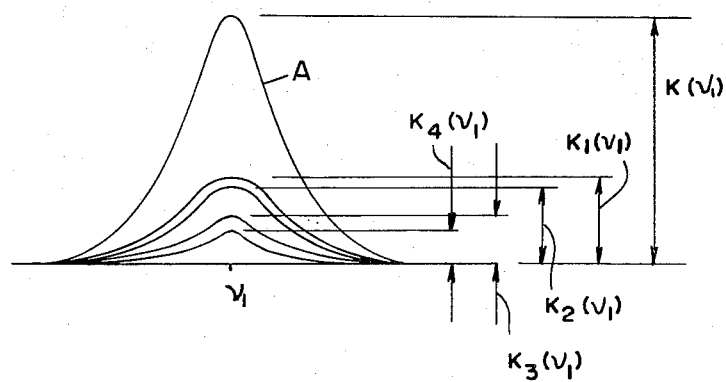
FIGS. 3a and 3b are graphs useful in understanding the technique for determining temperature profiles in accordance with the present invention
Figure 3B:
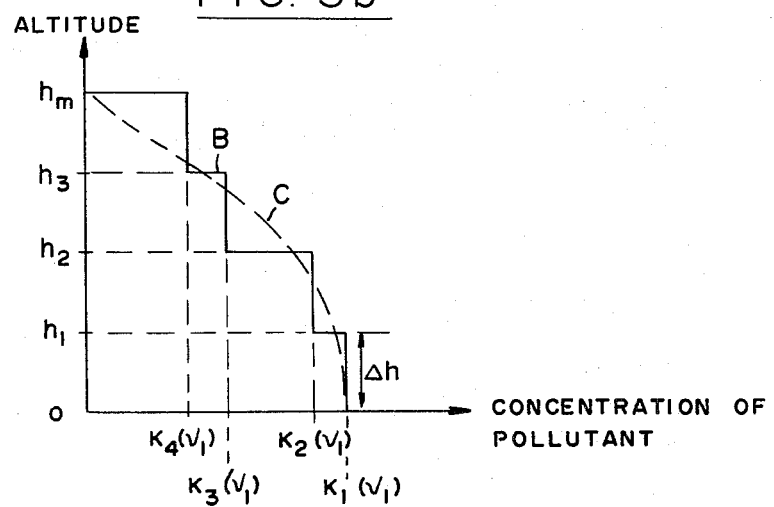

The manner in which this technique provides an altitude profile may be better visualized by reference to FIGS 3a and 3b. Assuming a measured bell-shaped curve A shown in FIG. 3a for an altitude $h_M$, and assuming four altitude segments of height interval $\Delta h$, the altitude profile of FIG. 3b is obtained by selecting Lorentzian curves 1, 2, 3 and 4 (shown in FIG. 3a) which, when added point by point, make up the measured curve A. Each of the Lorentzian curves has a half width corresponding to respective altitude segments $h_1$ to $h_4$. The peak height of each Lorentzian curve then indicates the average concentration of the pollutant plotted in FIG. 3b for the corresponding altitude segment. By selecting a larger number of smaller segments, the plotted altitude profile B may be made to more closely approach the true profile indicated by a dotted line curve C. This technique inherently yields the maximum altitude segment at which the pollutant is present.

Although a particular embodiment of the invention has been described and illustrated herein, it is recognized that modifications and variations may readily occur to those skilled in the art. It is therefore intended that the claims be interpreted to cover such modifications and variations.

I claim

1. An active method for monitoring atmospheric pollutants comprised of the following steps:

directing a laser beam of a selected frequency through the atmosphere to a reflecting surface to excite molecules of a pollutant of interest suspected of being present in the atmosphere between the laser beam source and the reflecting surface, said source being a heterodyne radiometer transmitter-receiver, detecting the absorption of said laser beam transmitted and reflected by said surface using said heterodyne radiometer transmitter-receiver in which a part of the laser beam being transmitted at said frequency is used through a frequency shifter as a heterodyne signal to detect the reflected signal, determining the path length traveled by the laser beam thus transmitted and reflected, and determining the concentration of the pollutant of interest from the measured absorption and the path length, said concentration being proportional to a ratio of measured absorption to path length, thereby determining the presence and average concentration $N$ of the pollutant of interest over said path length.

2. An active method as defined in claim 1 wherein said average concentration $N$ of the pollutant throughout the absorption path as determined from a measurement of total absorption $K$ at a particular frequency $\nu_1$ from the equation $$K(\nu_1) = 2/\pi \, S_o N \, [\Delta\nu/(\nu_1 - \nu_0)^2 + \Delta\nu^2] \, h_M$$

where $h_M$ is the maximum altitude of the path length, $\nu_0$ is the frequency of peak absorption, $S_o$ is the average line strength known in advance, and $\Delta\nu$ is the average line width also known in advance.

3. An active method as defined in claim 1 including the following further steps tuning said laser transmitter-receiver over a narrow frequency region which includes the absorption line of said pollutant of interest, and at each frequency determining the total absorption to obtain absorption versus frequency data which, when plotted, yields a bell-shaped curve comprised of a composite of Lorentzian shaped curves of various half widths, each corresponding to average absorption in a particular altitude segment, and determining the amplitudes of particular Lorentzian shaped curves that would make up said composite curve, said amplitudes giving average concentrations at respective altitude segments which when plotted as a function of altitude yields an altitude profile of pollutant concentration.

4. An active method for monitoring atmospheric pollutants as defined by claim 3 wherein the last step is effectively carried out by solving the following sets of equations;

$$K_1(\nu_1) = [2 S_o(h_1) N(h_1)/\pi] [\Delta\nu(h_1)/(\nu_1-\nu_o)^2 + [\Delta\nu(h_1)]^2] \Delta h$$
$$= C_{11}N(h_1)$$
$$K_2(\nu_1) = ]2 S_o(h_2) N(h_2)/\pi] [\Delta\nu(h_2)/(\nu_1-\nu_o)^2 + [\Delta\nu(h_2)]^2] \Delta h$$
$$= C_{12}N(h_2)$$

$$K_n(\nu_1) = [2 S_o(h_n) N(h_n)/\pi] [\Delta\nu(h_n)/(\nu_1-\nu_o)^2 + [\Delta\nu(h_n)]^2] \Delta h$$
$$= C_{1n}N(h_n)$$

where $h_1$ to $h_n$ are average altitudes within respective altitude segments 1 to $n$, assuming average values for $S_o$, $\Delta\nu$ and $N$ within each segment, and $$K(\nu_1) = C_{11}N(h_1) + C_{12}N(h_2) + \ldots + C_{1n}N(h_n)$$
$$K(\nu_2) = C_{21}N(h_1) + C_{22}N(h_2) + \ldots + C_{2n}N(h_n)$$

$$K(\nu_n) = C_{n1}N(h_1) + C_{n2}N(h_2) + \ldots + C_{nn}N(h_n)$$

where the number of frequencies $\nu_1, \nu_2 \ldots \nu_n$ used equals the number of altitude segments, $h_n$ is the average altitude within the nth altitude segment, $K(\nu_n)$ is the total absorption at frequency $\nu_n$, $K_n(\nu_1)$ is the absorption at frequency $\nu_1$ in the nth altitude segment, $N(h_n)$ is the average concentration in the nth altitude segment, $\Delta h$ is the height of each altitude segment, $\nu_o$ is the line center frequency, and $S_o$ and $\Delta\nu$ are line strength and line width parameters, respectively.

* * * * *